United States Patent
Matsuoka

(10) Patent No.: US 8,711,546 B2
(45) Date of Patent: Apr. 29, 2014

(54) METHOD OF FABRICATING SOLID ELECTROLYTIC CAPACITOR AND SOLID ELECTROLYTIC CAPACITOR

(75) Inventor: Keiko Matsuoka, Izumisano (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 80 days.

(21) Appl. No.: 13/235,828

(22) Filed: Sep. 19, 2011

(65) Prior Publication Data

US 2012/0075774 A1    Mar. 29, 2012

(30) Foreign Application Priority Data

Sep. 24, 2010    (JP) .................. 2010-214042

(51) Int. Cl.
*H01G 9/00*    (2006.01)

(52) U.S. Cl.
USPC .......... 361/523; 361/516; 361/519; 361/525; 361/528; 361/529; 29/25.01; 29/25.03

(58) Field of Classification Search
USPC ......... 361/523, 516–519, 525, 528–529, 530; 29/25.01, 25.03
See application file for complete search history.

(56) References Cited

U.S. PATENT DOCUMENTS

| | | | |
|---|---|---|---|
| 6,430,033 B1 * | 8/2002 | Mitsui et al. | 361/525 |
| 8,206,467 B2 * | 6/2012 | Hayashi et al. | 29/25.03 |
| 2003/0089197 A1 | 5/2003 | Wada et al. | |
| 2004/0168548 A1 | 9/2004 | Wada et al. | |
| 2009/0161297 A1 | 6/2009 | Kikuchi et al. | |

FOREIGN PATENT DOCUMENTS

| | | |
|---|---|---|
| JP | 8-78294 A | 3/1996 |
| JP | 2003-3204 A | 1/2003 |
| JP | 2007-220439 A | 8/2007 |
| JP | 2009-010238 A | 1/2009 |
| JP | 2009-152263 A | 7/2009 |
| JP | 2010-153417 A | 7/2010 |
| JP | 02012044141 * | 3/2012 |

OTHER PUBLICATIONS

Japanese Office Action dated Feb. 12, 2014, issued in corresponding Japanese Patent Application No. 2010-214042 with English translation (7 pages).

* cited by examiner

*Primary Examiner* — Nguyen T Ha
(74) *Attorney, Agent, or Firm* — Westerman, Hattori, Daniels & Adrian, LLP

(57) ABSTRACT

A method of fabricating a solid electrolytic capacitor of an aspect includes the steps of preparing an anode element with a dielectric layer formed on a surface thereof, forming a solid electrolytic layer on the dielectric layer, forming a carbon layer on the solid electrolytic layer, bringing an aqueous polymer into contact with the carbon layer, and forming a silver paste layer on the aqueous polymer. A method of fabricating a solid electrolytic capacitor and a solid electrolytic capacitor that can be improved in characteristics can thus be obtained.

4 Claims, 4 Drawing Sheets

METHOD OF FABRICATING SOLID ELECTROLYTIC CAPACITOR AND SOLID ELECTROLYTIC CAPACITOR

This nonprovisional application is based on Japanese Patent Application No. 2010-214042 filed on Sep. 24, 2010 with the Japan Patent Office, the entire contents of which are hereby incorporated by reference.

BACKGROUND OF THE INVENTION

1. Field of the Invention

The present invention relates to a method of fabricating a solid electrolytic capacitor and a solid electrolytic capacitor.

2. Description of the Related Art

As a conventional solid electrolytic capacitor, Japanese Patent Laying-Open No. 2009-10238 is mentioned, for example. FIG. 4 is a schematic sectional view showing a structure of the solid electrolytic capacitor disclosed in Japanese Patent Laying-Open No. 2009-10238. With reference to FIG. 4, the solid electrolytic capacitor of Japanese Patent Laying-Open No. 2009-10238 includes an anode element 1, a dielectric layer 2 formed at the surface of anode element 1, a conductive polymer layer 3 formed on dielectric layer 2, and a cathode layer 4 formed on conductive polymer layer 3. Cathode layer 4 has a carbon layer 4a made of a layer formed on conductive polymer layer 3 and containing carbon particles, and a silver paste layer 4b made of a layer formed on carbon layer 4a and containing silver particles.

As a method of fabricating a solid electrolytic capacitor of Japanese Patent Laying-Open No. 2009-10238, steps 1 to 4 below are disclosed. Specifically, first, anode element 1 is formed (step 1). Then, dielectric layer 2 is formed so as to surround anode element 1 (step 2). Then, conductive polymer layer 3 is formed on the surface of dielectric layer 2 (step 3). Then, carbon layer 4a is formed on conductive polymer layer 3, and further, the silver paste layer is formed on carbon layer 4a (step 4).

In the solid electrolytic capacitor and the method of fabricating the same disclosed in Japanese Patent Laying-Open No. 2009-10238, carbon layer 4a is formed. Since carbon layer 4a is fragile, cracks will be likely to occur. This raises a problem in that the solid electrolytic capacitor deteriorates in characteristics.

SUMMARY OF THE INVENTION

The present invention was made to solve the above-described problems, and has an object to provide a method of fabricating a solid electrolytic capacitor and a solid electrolytic capacitor that can be improved in characteristics.

A method of fabricating a solid electrolytic capacitor according to one aspect of the present invention includes the steps of preparing an anode element with a dielectric layer formed on a surface thereof, forming a solid electrolytic layer on the dielectric layer, forming a carbon layer on the solid electrolytic layer, bringing an aqueous polymer into contact with the carbon layer, and forming a silver paste layer on the aqueous polymer.

According to the method of fabricating a solid electrolytic capacitor of one aspect of the present invention, by the step of bringing an aqueous polymer into contact with the carbon layer, the carbon layer formed on the solid electrolytic layer can be coated with the aqueous polymer. The carbon layer is thus fixed by the aqueous polymer. In this state, by carrying out the step of forming the silver paste layer, the binder resin constituting the silver paste layer and the aqueous polymer are bound together, so that the aqueous polymer and the silver paste layer come into close contact. In this manner, since the carbon layer is fixed by the aqueous polymer, and the aqueous polymer and the silver paste layer come into close contact, the strength can be increased. Therefore, a solid electrolytic capacitor improved in characteristics can be fabricated.

A method of fabricating a solid electrolytic capacitor according to another aspect of the present invention includes the steps of preparing an anode element with a dielectric layer formed on a surface thereof, forming a solid electrolytic layer on the dielectric layer, bringing a mixed material of carbon and an aqueous polymer into contact with the solid electrolytic layer to form a mixed layer of carbon and the aqueous polymer, and forming a silver paste layer on the mixed layer.

According to the method of fabricating a solid electrolytic capacitor of the other aspect of the present invention, by bringing the mixed material of carbon and the aqueous polymer into contact with the solid electrolytic layer, carbon located on the solid electrolytic layer can be coated with the aqueous polymer. Carbon is thus fixed by the aqueous polymer. In this state, by carrying out the step of forming the silver paste layer, the binder resin constituting the silver paste layer and the aqueous polymer are bound together, so that the aqueous polymer and the silver paste layer come into close contact. In this manner, since carbon is fixed by the aqueous polymer, and the aqueous polymer and the silver paste layer come into close contact, the strength can be increased. Therefore, a solid electrolytic capacitor improved in characteristics can be fabricated.

In the methods of fabricating a solid electrolytic capacitor according to the one and the other aspects of the present invention, preferably, the aqueous polymer contains at least one of polyacrylic acid-based polymer and polyvinyl alcohol.

Since polyacrylic acid-based polymer and polyvinyl alcohol can easily cover carbon and can favorably fix the silver paste layer, a solid electrolytic capacitor improved more in characteristics can be fabricated.

A solid electrolytic capacitor of the present invention includes an anode element, a dielectric layer, a solid electrolytic layer, a mixed layer, and a silver paste layer. The dielectric layer is formed on the anode element. The solid electrolytic layer is formed on the dielectric layer. The mixed layer is formed on the solid electrolytic layer, and contains carbon and an aqueous polymer. The silver paste layer is formed on the mixed layer.

According to the solid electrolytic capacitor of the present invention, since the mixed layer contains an aqueous polymer, carbon on the solid electrolytic layer is coated with the aqueous polymer, and the binder resin constituting the silver paste layer is bound with the aqueous polymer. Carbon is thus fixed by the aqueous polymer, and the aqueous polymer and the silver paste layer are in close contact. The strength can thus be increased. Therefore, a solid electrolytic capacitor improved in characteristics can be achieved.

As described above, according to the method of fabricating a solid electrolytic capacitor and the solid electrolytic capacitor of the present invention, characteristics can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
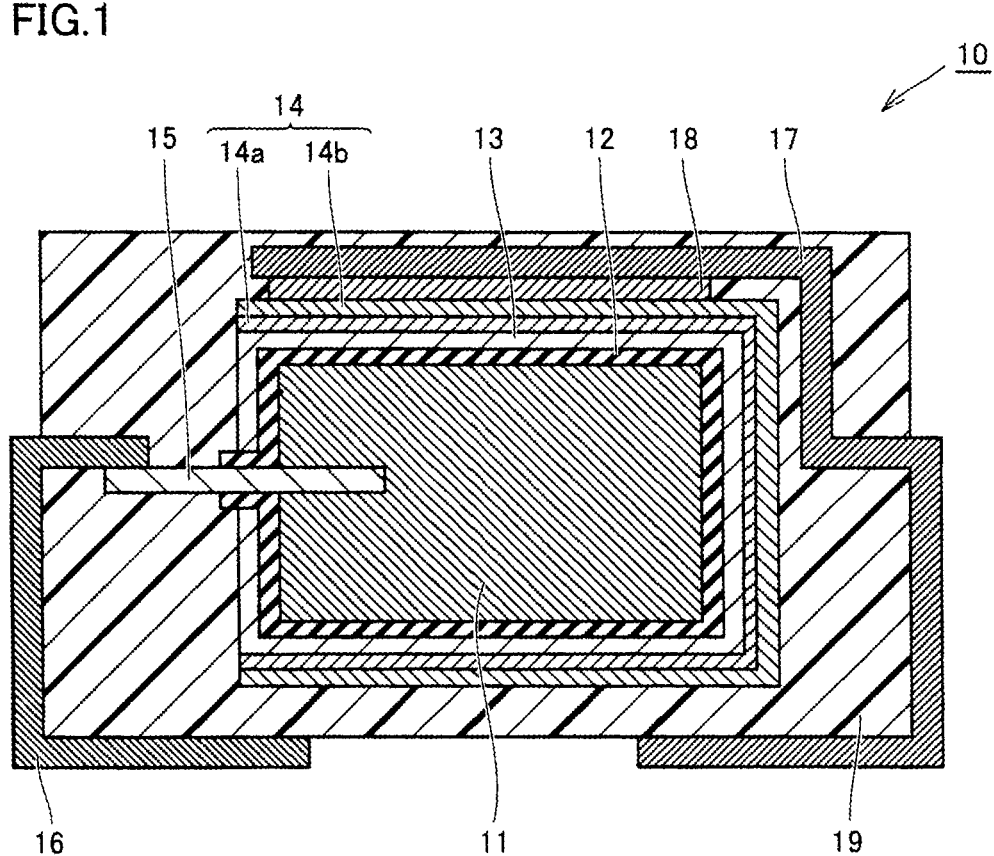
FIG. 1 is a sectional view schematically showing a structure of a solid electrolytic capacitor according to a first embodiment of the present invention.

Hereinafter, an embodiment of the present invention will be described based on the drawings. It is noted that like reference numeral denotes like or corresponding part in the drawings, description of which is not repeated.

First Embodiment

FIG. 1 is a sectional view schematically showing a structure of a solid electrolytic capacitor 10 according to a first embodiment of the present invention. With reference to FIG. 1, solid electrolytic capacitor 10 according to the first embodiment of the present invention will be described first.

As shown in FIG. 1, solid electrolytic capacitor 10 includes an anode element 11, a dielectric layer 12, a solid electrolytic layer 13, and a cathode layer 14 having a mixed layer 14a and a silver paste layer 14b. Anode element 11, dielectric layer 12, solid electrolytic layer 13, and cathode layer 14 constitute a capacitor element of solid electrolytic capacitor 10. Dielectric layer 12 is formed on anode element 11, and in the present embodiment, formed so as to contact anode element 11. Solid electrolytic layer 13 is formed on dielectric layer 12, and in the present embodiment, formed so as to contact dielectric layer 12. Mixed layer 14a is formed on solid electrolytic layer 13, and in the present embodiment, formed so as to contact solid electrolytic layer 13. Silver paste layer 14b is formed on mixed layer 14a, and in the present embodiment, formed so as to contact mixed layer 14a.

Anode element 11 is made of a sintered compact of a valve metal, for example. The valve metal includes, for example, tantalum (Ta), niobium (Nb), titanium (Ti), aluminium (Al), and the like. The sintered compact has a porous structure.

Dielectric layer 12 is an oxide film formed by subjecting the valve metal to chemical conversion. For example, the composition of dielectric layer 12 obtained by implementing the valve metal by tantalum is tantalum oxide ($Ta_2O_5$), and the composition of dielectric layer 12 obtained by implementing the valve metal by aluminium is aluminium oxide ($Al_2O_3$).

Solid electrolytic layer 13 is composed of a conductive polymer material, such as polypyrrole, polyfuran or polyaniline, TCNQ complex salt (7,7,8,8-tetracyanoquinodimethane), and the like. Solid electrolytic layer 13 preferably contains polypyrrole, and more preferably, is made of polypyrrole. Solid electrolytic layer 13 is preferably composed of polypyrrole produced by electrolytic polymerization.

Cathode layer 14 has mixed layer 14a located at the inner circumferential side and the silver paste layer located at the outer circumferential side.

Mixed layer 14a contains carbon and an aqueous polymer. That is, mixed layer 14a contains carbon and an aqueous polymer as its constituents. Carbon can be implemented by graphite, for example. The aqueous polymer can be implemented by, for example, polyacrylic acid-based polymer, polyvinyl alcohol, cellulose ester, cellulose ether, polyamino acid, polyethylene oxide, polyacrylamide, methyl cellulose, or the like, and preferably contains at least one of polyacrylic acid-based polymer and polyvinyl alcohol.

Silver paste layer 14b contains a binder resin and silver particles. The binder resin is not particularly limited, but can be implemented by, for example, an imide-based polymer, an epoxy-based polymer or the like.

Solid electrolytic capacitor 10 of the present embodiment further includes an anode lead 15, an anode terminal 16, a cathode terminal 17, and an adhesion layer 18.

Anode lead 15 is a rod-like member made of metal such as tantalum, for example, with its one end embedded in anode element 11 and the other end arranged to protrude from the capacitor element to the outside. Anode terminal 16 is partly connected to anode lead 15 by welding or the like. Cathode terminal 17 is arranged to be connected to cathode layer 14, which is the outermost layer of the capacitor element, with adhesion layer 18 made of a conductive adhesive interposed therebetween. Anode terminal 16 and cathode terminal 17 are made of metal, such as copper or copper alloy, for example.

Solid electrolytic capacitor 10 of the present embodiment further includes an exterior resin 19. Exterior resin 19 seals the capacitor element with anode lead 15, anode terminal 16, cathode terminal 17, and adhesion layer 18 arranged such that portions of anode terminal 16 and cathode terminal 17 are exposed. Exterior resin 19 can be implemented by epoxy resin, for example.

Figure 2:
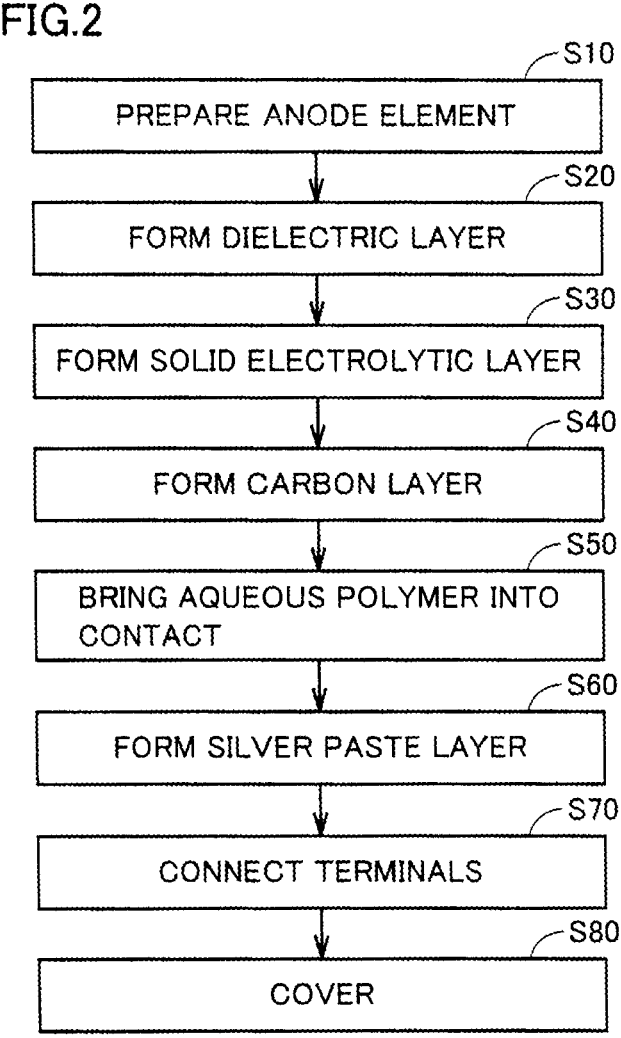
FIG. 2 is a flow chart showing a method of fabricating a solid electrolytic capacitor according to the first embodiment of the present invention.

With reference to FIGS. 1 and 2, a method of fabricating solid electrolytic capacitor 10 according to the present embodiment will now be described. It is noted that FIG. 2 is a flow chart showing a method of fabricating solid electrolytic capacitor 10 according to the first embodiment of the present invention.

First, as shown in FIG. 2, anode element 11 is prepared (S10). In step S10, raw material powder, which is powder of a valve metal, for example, is prepared, and is molded into a desired shape with one end of anode lead 15 in the longitudinal direction embedded in the raw material powder. Then, the molded raw material powder is sintered, so that anode element 11 with one end of anode lead 15 embedded therein can be formed. Anode lead 15 and anode element 11 are preferably made of an identical valve metal.

Then, dielectric layer 12 is formed on anode element 11 (S20). In this step S20, for example, anode element 11 is immersed in an acid solution, such as nitric acid or phosphoric acid, to be subjected to electrolytic chemical conversion, so that dielectric layer 12 is formed at a surface portion of anode element 11. By carrying out these steps S10 and S20, anode element 11 with dielectric layer 12 formed on its surface can be prepared.

Then, solid electrolytic layer 13 is formed on dielectric layer 12 (S30). In this step S30, solid electrolytic layer 13 made of a conductive polymer is formed on dielectric layer 12 by electrolytic polymerization, chemical polymerization, or the like. Solid electrolytic layer 13 is preferably formed by electrolytic polymerization.

When forming solid electrolytic layer 13 by electrolytic polymerization, a method of immersing anode element 11 with dielectric layer 12 formed thereon in an electrolytic polymerization liquid containing a monomer and a dopant, for example, thereby causing electrolytic oxidation with anode element 11 serving as an anode can be adopted.

When forming solid electrolytic layer 13 by chemical polymerization, a method of immersing anode element 11 with dielectric layer 12 formed thereon in a chemical polymerization liquid containing a monomer, an oxidant and a dopant, a method of applying the above-described chemical polymerization liquid onto anode element 11 with dielectric layer 12 formed thereon, a method of immersing anode element 11 with dielectric layer 12 formed thereon in each of a monomer solution and an oxidant solution, and a method of applying each of a monomer solution and an oxidant solution onto anode element 11 with dielectric layer 12 formed thereon, or the like can be adopted.

It is noted that, in the above-described chemical polymerization, it is not always necessary to implement the oxidant and the dopant by different materials, but a material that serves both as the oxidant and the dopant can be used. Moreover, besides the above-described material, an additive such as a surface active agent may be added to the above-described chemical polymerization liquid or the electrolytic polymerization liquid. Further, thermochemical polymerization of applying heat after the above-described chemical polymerization may be performed.

Then, a carbon layer is formed on solid electrolytic layer 13 (S40). In this step S40, for example, a carbon paste is applied onto solid electrolytic layer 13, or solid electrolytic layer 13 is immersed in liquid in which carbon powder is diffused in water or an organic solvent, and then dried, so that the carbon layer is formed. By carrying out this step S40, the carbon layer is arranged on solid electrolytic layer 13.

Then, an aqueous polymer is brought into contact with the carbon layer (S50). In this step S50, for example, an aqueous polymer is applied onto the carbon layer formed in step S40, and is dried. Mixed layer 14a containing carbon and the aqueous polymer can thus be formed. Through this step S50, the aqueous polymer penetrates between carbon particles arranged on solid electrolytic layer 13 in step S40, and the aqueous polymer coats the surface of the carbon layer. Further, resistance can be reduced by forming the carbon layer and then bringing the aqueous polymer into contact with the carbon layer.

Then, silver paste layer 14b is formed on the aqueous polymer (mixed layer 14a) (S60). In this step S60, for example, a silver paste layer is applied onto solid electrolytic layer 13, and then drying, thereby forming silver paste layer 14b. The step of applying silver paste layer 14b is not particularly limited, but dipping, screen printing or the like can be adopted. Through this step S60, the aqueous polymer formed in step S50 and the binder resin in the silver paste layer are bound together. Since this binding is made between polymers, the functional group of the aqueous polymer and that of the binder resin are bound together, so that the binding strength can be improved.

By carrying out steps S40 to S60, cathode layer 14 having mixed layer 14a containing carbon and the aqueous polymer and silver paste layer 14b formed on mixed layer 14a can be formed. By further carrying out steps S10 to S60, the capacitor element constituting solid electrolytic capacitor 10 of the present embodiment can be fabricated.

Then, each of anode terminal 16 and cathode terminal 17 is connected to anode element 11 and cathode layer 14 (S70). In this step S70, anode terminal 16 made of copper or copper alloy, for example, is connected to anode lead 15, and cathode terminal 17 made of copper or copper alloy is connected to cathode layer 14. Cathode layer 14 and cathode terminal 17 are connected to each other by means of adhesion layer 18, for example. Anode terminal 16 and anode lead 15 can be connected by resistance welding, for example. It is noted that cathode layer 14 and cathode terminal 17 may be connected to each other by resistance welding, and anode terminal 16 and anode lead 15 may be connected by means of adhesion layer 18.

Covering with exterior resin 19 then follows (S80). In this step S80, exterior resin 19 covers the capacitor element such that portions of anode terminal 16 and cathode terminal 17 are exposed to the outside. The method of covering is not particularly limited, but transfer molding or the like is adopted, for example. Then, the exposed portions of anode terminal 16 and cathode terminal 17 at exterior resin 19 are bent alone exterior resin 19.

It is noted that, by carrying out step S80 of covering with exterior resin 19 heat is applied to the aqueous polymer. Hardening of the aqueous polymer can further improve the strength.

By carrying out steps S10 to S80 described above, solid electrolytic capacitor 10 shown in FIG. 1 can be fabricated.

As described above, the solid electrolytic capacitor and the method of fabricating the same of the present embodiment includes step S40 of forming the carbon layer on solid electrolytic layer 13, step S50 of bringing the aqueous polymer into contact with the carbon layer, and step S60 of forming silver paste layer 14b on the aqueous polymer. Through step S50 of bringing the aqueous polymer into contact with the carbon layer, the carbon layer formed on solid electrolytic layer 13 can be coated with the aqueous polymer. The carbon layer is thus fixed by the aqueous polymer. In this state, by carrying out step S60 of forming silver paste layer 14b, the binder resin constituting silver paste layer 14b and the aqueous polymer are bound together, so that the aqueous polymer and silver paste layer 14b come into close contact. In this manner, since the carbon layer is fixed by the aqueous polymer, and the aqueous polymer and silver paste layer 14b come into close contact, the strength can be increased more than in the case where only the carbon layer is arranged between solid electrolytic layer 13 and silver paste layer 14b. This can reduce the occurrence of cracks that would result from lack of strength. Therefore, a solid electrolytic capacitor improved in characteristics, such as reliability, equivalent series inductance (ESL) capacitance (Cap), leakage current (LC), can be fabricated.

Moreover, since the carbon layer is fixed by the aqueous polymer, and the aqueous polymer and silver paste layer 14b come into close contact, the gap between mixed layer 14a containing carbon and the aqueous polymer and solid electrolytic layer 13, as well as the gap between mixed layer 14a containing carbon and the aqueous polymer and silver paste layer 14b can be reduced. That is, by forming mixed layer 14a containing carbon and the aqueous polymer between solid electrolytic layer 13 and silver paste layer 14b, the gap between solid electrolytic layer 13 and silver paste layer 14b can be reduced. Therefore, a solid electrolytic capacitor improved in characteristics can be fabricated.

In the solid electrolytic capacitor and the method of fabricating the same according to the present embodiment, preferably, the aqueous polymer contains at least one of polyacrylic acid-based polymer and polyvinyl alcohol. Since polyacrylic acid-based polymer and polyvinyl alcohol can be bound with carbon, and can favorably fix silver paste layer 14b, a solid electrolytic capacitor improved more in characteristics can be fabricated.

Second Embodiment

Since a solid electrolytic capacitor according to a second embodiment of the present invention is similar to solid electrolytic capacitor 10 according to the first embodiment shown in FIG. 1, description thereof is not repeated.

Figure 3:
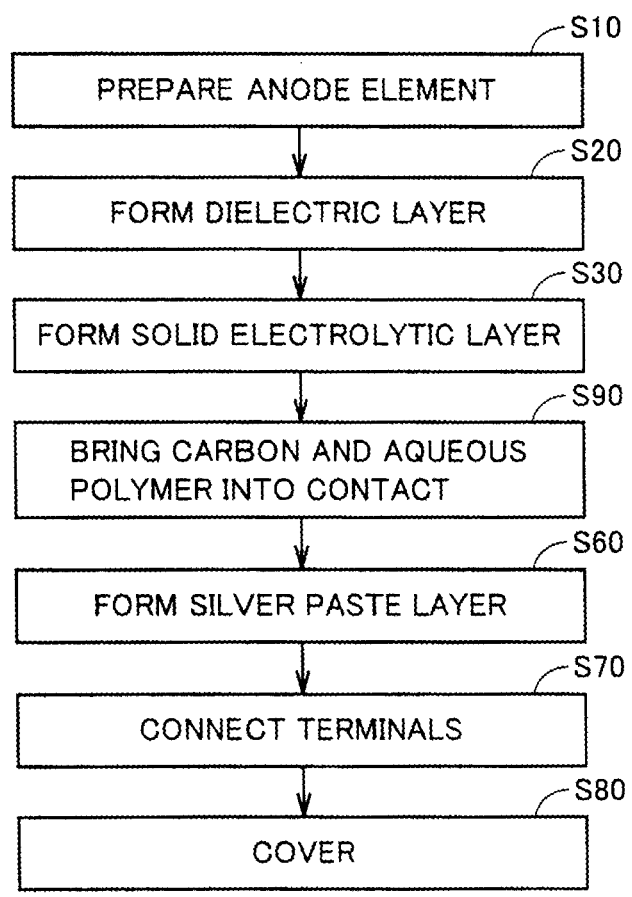
FIG. 3 is a flow chart showing a method of fabricating a solid electrolytic capacitor according to a second embodiment of the present invention.
Figure 4:
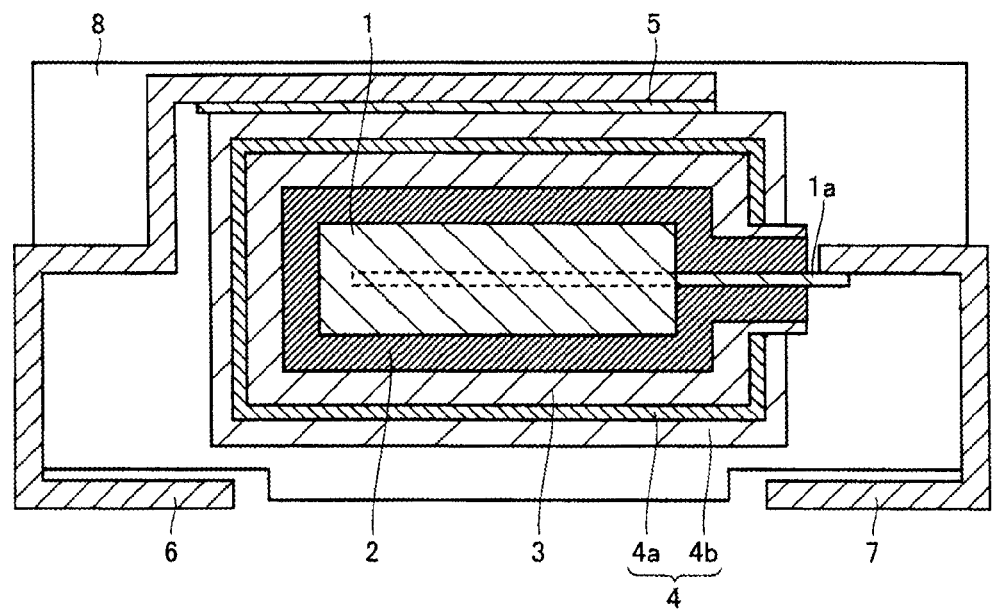
FIG. 4 is a sectional view schematically showing a structure of a solid electrolytic capacitor of Japanese Patent Laying-Open No. 2009-10238.

FIG. 3 is a flow chart showing a method of fabricating a solid electrolytic capacitor according to the second embodiment of the present invention. With reference to FIGS. 1 and 3, the method of fabricating a solid electrolytic capacitor according to the present embodiment will now be described.

First, step S10 of preparing anode element 11, step S20 of forming dielectric layer 12 on anode element 11, and step S30 of forming solid electrolytic layer 13 on dielectric layer 12 are carried out. Since these steps S10 to S30 are similar to those of the first embodiment, description thereof is not repeated.

Then, a mixed material of carbon and an aqueous polymer is brought into contact with solid electrolytic layer 13 to form mixed layer 14a of carbon and the aqueous polymer (S90). This step S90 is carried out as follows, for example. Specifically, a mixed material of carbon powder and an aqueous polymer is prepared with water used as a solvent. The aqueous polymer diffuses well by the use of water as a solvent. Thereafter, solid electrolytic layer 13 is immersed in this mixed material, or the mixed material is applied onto the surface of solid electrolytic layer 13. Drying follows. The outer periphery of mixed layer 14a formed in this step S90 is coated with the aqueous polymer.

Then, silver paste layer 14b is formed on mixed layer 14a (S60). Since this step S60 is similar to that of the first embodiment, description thereof is not repeated. The capacitor element of the present embodiment can be fabricated through steps S10 to S30, S60 and S90 described above.

Then, each of anode terminal 16 and cathode terminal 17 is connected to anode element 11 and cathode layer 14 (S70). Covering with exterior resin 19 then follows (S80). Since these steps S70 and S80 are similar to those of the first embodiment, description thereof is not repeated.

By carrying out steps S10 to S30 and S60 to S90 described above, solid electrolytic capacitor 10 shown in FIG. 1 can be fabricated.

As described above, the solid electrolytic capacitor and the method of fabricating the same according to the present embodiment includes step S90 of bringing the mixed material of carbon and the aqueous polymer into contact with solid electrolytic layer 13 and step S60 of forming silver paste layer 14b on mixed layer 14a. By bringing the mixed material of carbon and the aqueous polymer into contact with solid electrolytic layer 13 in step S90, carbon located on solid electrolytic layer 13 can be coated with the aqueous polymer. Carbon is thus fixed by the aqueous polymer. In this state, by carrying out step S60 of forming silver paste layer 14b, the binder resin constituting silver paste layer 14b and the aqueous polymer are bound together, so that the aqueous polymer and silver paste layer 14b come into close contact. In this manner, since the carbon layer is fixed by the aqueous polymer, and the aqueous polymer and silver paste layer 14b come into close contact, the strength can be increased more than in the case where only the carbon layer is arranged between solid electrolytic layer 13 and silver paste layer 14b. Therefore, a solid electrolytic capacitor improved in characteristics can be fabricated.

Moreover, since the carbon layer is fixed by the aqueous polymer, and the aqueous polymer and silver paste layer 14b come into close contact, the gap between mixed layer 14a containing carbon and the aqueous polymer and solid electrolytic layer 13, as well as the gap between mixed layer 14a containing carbon and the aqueous polymer and silver paste layer 14b can be reduced. That is, by forming mixed layer 14a containing carbon and the aqueous polymer between solid electrolytic layer 13 and silver paste layer 14b, the gap between solid electrolytic layer 13 and silver paste layer 14b can be reduced. Therefore, a solid electrolytic capacitor improved in characteristics can be fabricated.

EXAMPLE

In the present example, the effect exerted by forming a mixed layer containing carbon and an aqueous polymer between a solid electrolytic layer and a silver paste layer was studied.

Example 1 of the Present Invention

In Example 1 of the present invention, solid electrolytic capacitor 10 shown in FIG. 1 was fabricated basically in accordance with the method of fabricating a solid electrolytic capacitor of the above-described first embodiment.

Specifically, first, tantalum powder was prepared, and was molded into rectangular solid with one end of anode lead 15, which was a rod-like member, in the longitudinal direction embedded in the tantalum powder. Then, this was sintered to prepare anode element 11 with one end of anode lead 15 embedded therein (S10).

Then, anode element 11 was immersed in a phosphoric acid solution, and a voltage was applied, thereby forming dielectric layer 12 made of $Ta_2O_5$ at the surface of anode element 11 (S20).

Then, anode element 11 with dielectric layer 12 formed thereon was immersed in an electrolytic polymerization liquid containing polypyrrole to form solid electrolytic layer 13. Drying followed to form solid electrolytic layer 13 on dielectric layer 12 (S30).

Then, a carbon paste was applied onto solid electrolytic layer 13, and dried for 10 minutes, thereby forming the carbon layer (S40).

Then, a polyacrylic acid-based polymer was applied onto the carbon layer as the aqueous polymer (S50). Mixed layer 14a was thereby formed.

Then, silver paste layer 14b was formed on mixed layer 14a using a silver paste having silver powder whose mean particle diameter ranged from 0.2 to 1.0 μm, NMP (N-methyl-2-pyrrolidone) as a solvent, and an epoxy-based resin as a binder resin (S60).

Then, anode terminal 16 was connected to anode lead 15 by spot welding, and cathode terminal 17 was connected to cathode layer 14 with conductive adhesion layer 18 interposed therebetween (S70). Then, the whole was molded to be covered with exterior resin 19 (S80).

Through steps S10 to S80 described above, solid electrolytic capacitor 10 of Example 1 of the present invention including mixed layer 14a formed on solid electrolytic layer 13 and containing carbon and the aqueous polymer and silver paste layer 14b formed on mixed layer 14a was fabricated, as shown in FIG. 1.

Example 2 of the Present Invention

In Example 2 of the present invention, solid electrolytic capacitor 10 shown in FIG. 1 was fabricated basically in accordance with the method of fabricating a solid electrolytic capacitor of the above-described second embodiment.

Specifically, step S10 of preparing anode element 11, step S20 of forming dielectric layer 12 on anode element 11, and step S30 of forming solid electrolytic layer 13 on dielectric layer 12 were carried out.

Then, a mixed material of carbon and an aqueous polymer was brought into contact with solid electrolytic layer 13 to form a mixed layer of carbon and the aqueous polymer (S90).

Carbon was implemented by graphite powder, and the aqueous polymer was implemented by one similar to that of Example 1 of the present invention.

Then, similarly to Example 1 of the present invention, silver paste layer 14b was formed on mixed layer 14a (S60), each of anode terminal 16 and cathode terminal 17 was connected to anode element 11 and cathode layer 14 (S70), and covering with exterior resin 19 followed (S80).

Through steps S10 to S30 and S60 to S90 described above, solid electrolytic capacitor 10 of Example 2 of the present invention including mixed layer 14a formed on solid electrolytic layer 13 and containing carbon and the aqueous polymer and silver paste layer 14b formed on mixed layer 14a was fabricated, as shown in FIG. 1.

Comparative Example 1

Comparative Example 1 was fabricated basically similarly to solid electrolytic capacitor 10 of Example 1 of the present invention, but differed in that step S50 of bringing the aqueous polymer into contact with the carbon layer was not carried out. Accordingly, the solid electrolytic capacitor of Comparative Example 1 included the carbon layer formed on the solid electrolytic layer and the silver paste layer formed on the carbon layer.

(Evaluation Method)

The solid electrolytic capacitors of Examples 1 and 2 of the present invention and Comparative Example 1 were measured in ESR using an LCR meter. The condition for measuring ESR was 100 kHz. The results are shown in Table 1 below.

TABLE 1

| | ESR (m$\Omega$) | | |
| --- | --- | --- | --- |
| | Average | Maximum | Minimum |
| Example 1 of the present invention | 11 | 12 | 9 |
| Example 2 of the present invention | 11 | 12 | 9 |
| Comparative Example 1 | 12 | 13 | 11 |

(Evaluation Result)

In Example 1 of the present invention in which step S40 of forming the carbon layer on solid electrolytic layer 13 and step S50 of bringing the aqueous polymer into contact with the carbon layer were carried out and Example 2 of the present invention 2 in which step S90 of bringing a mixed material of carbon and an aqueous polymer into contact with the solid electrolytic layer was carried out, mixed layer 14a formed on solid electrolytic layer 13 and containing carbon and the aqueous polymer could be formed. Examples 1 and 2 of the present invention in which mixed layer 14a was formed could be improved in ESR as compared to Comparative Example 1 in which an aqueous polymer was not arranged between carbon and silver paste layer 14b, as shown in Table 1. This has revealed that ESR can be improved by arranging an aqueous polymer between carbon and silver paste layer 14b.

From the foregoing, according to the present Examples, it has been confirmed that the solid electrolytic capacitor can be improved in characteristics by forming the mixed layer containing carbon and the aqueous polymer between the solid electrolytic layer and the silver paste layer.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of fabricating a solid electrolytic capacitor, comprising the steps of:

preparing an anode element with a dielectric layer formed on a surface thereof;

forming a solid electrolytic layer on said dielectric layer;

forming a carbon layer on said solid electrolytic layer;

applying an aqueous polymer onto said carbon layer; and forming a silver paste layer on said aqueous polymer, wherein said aqueous polymer is at least one selected from the group consisting of polyacrylic acid-based polymer, polyvinyl alcohol, cellulose ester, cellulose ether, polyamino acid, polyethylene oxide, polyacrylamide, and methyl cellulose.

2. A method of fabricating a solid electrolytic capacitor, comprising the steps of:

preparing an anode element with a dielectric layer formed on a surface thereof;

forming a solid electrolytic layer on said dielectric layer;

applying a mixed material of carbon and an aqueous polymer onto said solid electrolytic layer to form a mixed layer of carbon and said aqueous polymer; and forming a silver paste layer on said mixed layer, wherein said aqueous polymer is at least one selected from the group consisting of polyacrylic acid-based polymer, polyvinyl alcohol, cellulose ester, cellulose ether, polyamino acid, polyethylene oxide, polyacrylamide, and methyl cellulose.

3. A solid electrolytic capacitor comprising:

an anode element;

a dielectric layer formed on said anode element;

a solid electrolytic layer formed on said dielectric layer;

a mixed layer formed on said solid electrolytic layer and containing carbon and an aqueous polymer; and a silver paste layer formed on said mixed layer, wherein said aqueous polymer is at least one selected from the group consisting of polyacrylic acid-based polymer, polyvinyl alcohol, cellulose ester, cellulose ether, polyamino acid, polyethylene oxide, polyacrylamide, and methyl cellulose.

4. A solid electrolytic capacitor comprising:

an anode element;

a dielectric layer formed on said anode element;

a solid electrolytic layer formed on said dielectric layer;

a carbon layer formed on said solid electrolytic layer;

a layer of an aqueous polymer formed on said carbon layer; and a silver paste layer formed on the layer of said aqueous polymer, wherein said aqueous polymer is at least one selected from the group consisting of polyacrylic acid-based polymer, polyvinyl alcohol, cellulose ester, cellulose ether, polyamino acid, polyethylene oxide, polyacrylamide, and methyl cellulose.

* * * * *